(12) United States Patent
Hamilton

(10) Patent No.: US 10,215,523 B1
(45) Date of Patent: Feb. 26, 2019

(54) SAFETY SYSTEM FOR A SPEARGUN

(71) Applicant: Jordan Lee Hamilton, Eden Prairie, MN (US)

(72) Inventor: Jordan Lee Hamilton, Eden Prairie, MN (US)

( * ) Notice: Subject to any disclaimer, the term of this patent is extended or adjusted under 35 U.S.C. 154(b) by 0 days.

(21) Appl. No.: 15/807,507

(22) Filed: Nov. 8, 2017

(51) Int. Cl.
*F41B 7/04* (2006.01)
*F41B 5/12* (2006.01)
*A01K 81/04* (2006.01)

(52) U.S. Cl.
CPC .............. *F41B 7/046* (2013.01); *A01K 81/04* (2013.01); *F41B 5/12* (2013.01); *F41B 7/04* (2013.01)

(58) Field of Classification Search
CPC .......... F41B 5/12; F41B 5/1469; F41B 3/005; F41B 7/04
See application file for complete search history.

(56) References Cited

U.S. PATENT DOCUMENTS

| 4,206,740 | A | * | 6/1980 | Lydon | F41B 5/12 124/25 |
| 4,294,222 | A | * | 10/1981 | Pelsue | F41B 5/12 124/25 |
| 4,721,092 | A | * | 1/1988 | Waiser | F41B 5/1469 124/25 |
| 4,962,747 | A | * | 10/1990 | Biller | F41B 7/046 124/22 |
| 5,215,069 | A | * | 6/1993 | Liu | F41B 5/12 124/25 |
| 6,736,123 | B1 | * | 5/2004 | Summers | F41A 17/46 124/25 |
| 9,097,485 | B2 | * | 8/2015 | Lipowski | F41A 17/46 |
| 2017/0115089 | A1 | * | 4/2017 | Middleton | F41B 5/12 |

* cited by examiner

*Primary Examiner* — John Ricci
(74) *Attorney, Agent, or Firm* — The Olmsted Law Group, PLLC; Andrew Olmsted

(57) ABSTRACT

An improvement upon speargun safeties found in the prior art is disclosed. This system includes a safety capable of being placed in more than one position, with at least one position preventing loading the speargun by blocking engagement of the spear shaft with the trigger group, one position preventing firing of the speargun by blocking rear travel of the trigger and release of the spear and one position allowing firing of the speargun by allowing rear travel of the trigger.

5 Claims, 3 Drawing Sheets

SAFETY SYSTEM FOR A SPEARGUN

CROSS-REFERENCE TO RELATED APPLICATIONS

This application claims priority of provisional application No. 62/419,687, filed Nov. 9, 2016.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable

FIELD OF THE INVENTION

The present invention generally relates to spearguns. In particular, the present invention relates to devices to prevent trigger release and/or inadvertent firing of the spear from a speargun (hereinafter "safeties").

BACKGROUND OF THE INVENTION

The concept of using a spear to capture fish for sport and food can be traced back thousands of years. For instance, the Greek God Neptune is frequently depicted holding a trident. Native American cultures also often utilized spears to hunt fish and other aquatic life.

Modern spearfishing can be traced back to the early 1900s when spearfishermen utilized swimming goggles to see underwater. Early spearguns were basic, though they shared many of the primary concepts of modern spearguns: a spear, a means for the user to aim the spear at a fish, a means for propelling the spear at a fish when desired and a means to fire the spear at the fish.

Over the past century, advancements in materials science, engineering and other improvements from extensive R&D within the spearfishing industry give us a speargun sharing many of the same features as the original spearguns, though greatly improved. Today's spearfishing industry is much more safety-conscious than that of its founders. An important feature of modern spearguns is the presence of what is colloquially referred to as a safety—a mechanism that prevents unwanted and/or accidental discharge of a spear. Speargun safeties are what this application predominantly focuses upon.

Safeties on modern spearguns generally consist of one of three designs. The first is a "tab" type mechanism, where a tab featured near the side of the trigger may be raised or lowered by a user's finger. When engaged, the speargun will not fire; when flipped up or down (depending on the exact design), the speargun will fire. The second is a "rotational" type mechanism, where a protrusion featured near the side of the trigger may be rotated clockwise or counterclockwise by a user's finger. When engaged, the speargun will not fire; when rotated clockwise or counterclockwise (depending on the exact design), the speargun will fire. The third is a "push bar" type, where a bar is able to protrude through the receiver of a speargun and be pushed from side to side by the user. When pushed to one side, the speargun will not fire; when pushed to the other side, the speargun will fire.

There are shortcomings in each design however. From a safety standpoint, it can be difficult for a user to determine whether the safety is engaged or not. Safeties common in the prior art have attempted to remedy this problem using a few well-intentioned means. More-common "solutions" include use of "S or F" to indicate safe or fire, use of images with one image crossed out and the use of red or another high visibility color to indicate the speargun is ready to fire. While each solution is indeed better than no indication, each solution has its own issues. For instance, red is a highly visible color on land, but red is the first color in the visible spectrum to disappear under water. What is bright red on land quickly turns dark brown underwater. Use of images can be confusion as well. Users are often left trying to remember if a crossed out image means the speargun is unable to fire at the target, or able to fire and kill a fish. Furthermore, refraction causes images seen underwater to appear to be a different size than they actually are, which could further lead to user confusion.

Another problem found in the prior art is that side-mounted safeties may require the user to turn the speargun to determine whether the safety engaged, possibly at an unintended target.

From a sporting standpoint, safeties found in the prior art may be difficult to disengage without momentarily losing track of the target with the muzzle of the speargun. Spearfishermen also frequently use wetsuits and wetsuits gloves. As a result, much dexterity is lost. Disengaging safeties found in the prior art may be difficult with bulky fingertips.

In addition to the aforementioned improvements on the safeties found in the prior art, the present invention is the first known to the inventor which allows for an easy retrofit onto the trigger mechanisms used in many common types of spearguns. Custom speargun builders could incorporate the present invention onto their existing speargun stocks.

Therefore, there is a need for a safety mechanism easily engaged/disengaged with bulky fingertips without losing track of a target, which is also easily discernable as to whether it is engaged or disengaged.

The inventor has performed a search of the prior art and believes the present invention is a new and useful invention for which patent protection is warranted.

SUMMARY OF THE INVENTION

Within the preferred embodiment, and any alternative embodiments disclosed herein, a safety mechanism for a speargun is provided. A lever mounted behind the trigger of a speargun may be set to differing positions depending on whether the user wishes to load the speargun, prevent firing of the speargun, or enable firing of the speargun. The entire nature of the system is such that the user may easily discern which position the safety is in. When the safety is cocked back, the speargun is ready to fire. When the safety is moved forward, the speargun will not fire. This simple back-to-fire, front-is-safe concept is instinctive, as the user has to disengage the safety to enable to trigger to fully travel backward to fire. Important too is the speargun is still able to fire from any safe position without any unnecessary delay by simply flipping the safety backwards.

DETAILED DESCRIPTION OF THE INVENTION

Figure 1:
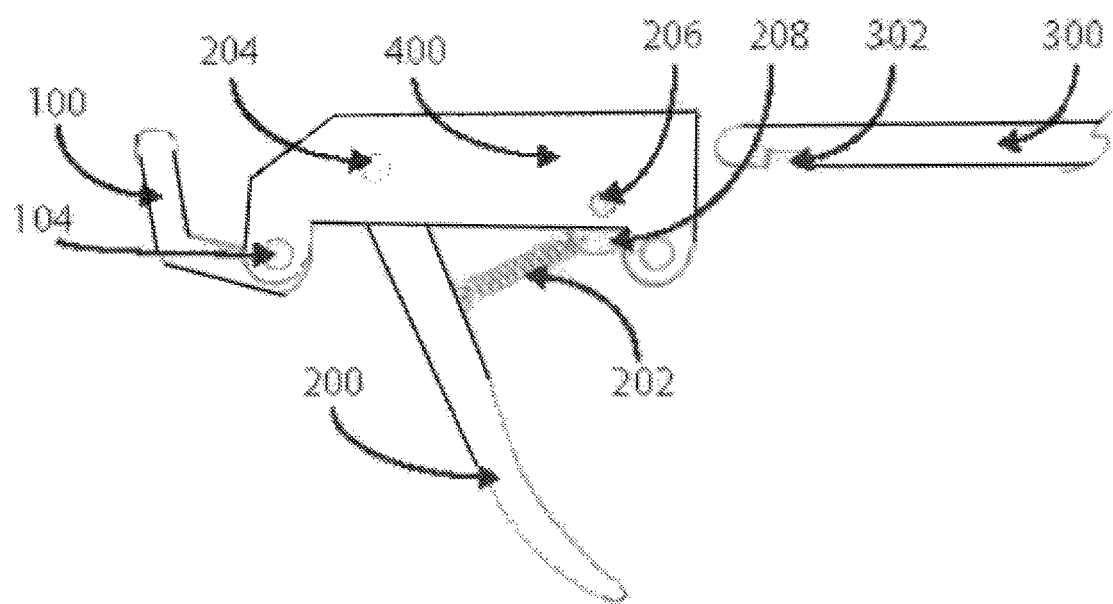
FIG. 1 is a perspective view of the present invention, as it would be seen during loading of the speargun, with the safety disengaged.

Referring now to FIG. 1, there is shown a safety lever 100, rotationally mounted near the posterior portion of the receiver 400 of a speargun upon a safety pivot 104. Anterior to the safety lever 100 is shown a trigger 200, also rotatably mounted to the same receiver 400 by means of a trigger pivot 204. A return spring 202 attached at one end to the trigger 200 and at the other end to a spring attachment 208, causes the trigger 200 to travel forward when the speargun is not loaded. The spring attachment 208 is mounted within the receiver 400 by means of a spring pivot 206. Also shown in FIG. 1 is a spear shaft 300 and shaft notch 302.

When the spear shaft 300 is not loaded in the speargun, the trigger 200 is pulled anteriorly by the return spring 202. As the spear shaft 300 is forcibly pushed backward, the inner workings of this particular trigger group (not shown) cause a sear within the receiver 400 to engage with the shaft notch 302, causing the trigger 200 to engage via a sear stop tang. The workings of this particular trigger group are a proprietary design and not relevant to the scope of the present invention. For the purposes of readability and clarity, they have been omitted from the figures and from reference.

One important safety feature of the present invention is the spear shaft 300 may only be loaded into the receiver 400 when the safety lever 100 is disengaged. By its nature, the present invention forces the user to remember to engage the safety lever 100 every time the user loads the spear shaft 300 (as shown in FIG. 2).

Figure 2:
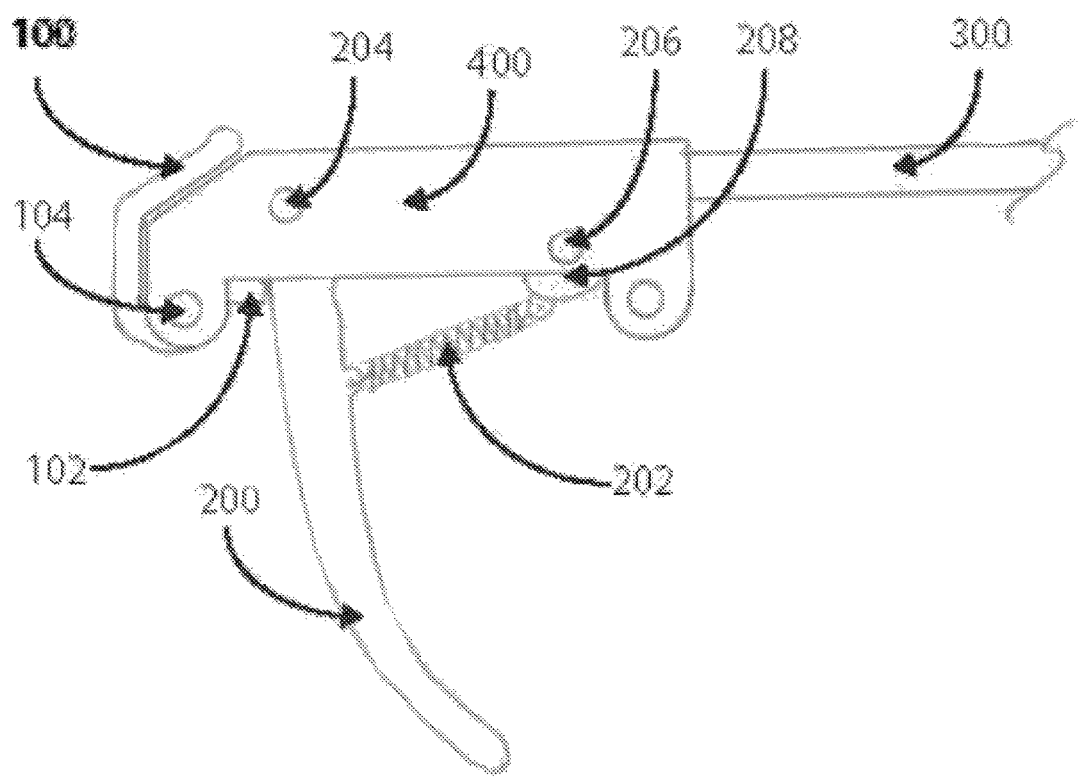
FIG. 2 is a perspective view of the present invention, as it would be seen after loading the speargun, with the safety engaged.

Referring now to FIG. 2, there is shown the entire system with the spear shaft 300 loaded and the safety lever 100 engaged. Noticeably absent in FIG. 1, but clearly shown in FIG. 2 is the location of the safety block 102 posterior to the trigger 200. The safety block 102 prevents posterior travel of the trigger 200 (which would fire the speargun). It is only by rotating the safety lever 100 towards the user about the safety pivot 104 that the safety block 102 would rotate upwards within the receiver 400. Once the safety lever 100 is rotated and the safety block 102 is within the receiver 400, the trigger 200 may travel posteriorly and the speargun fire.

Figure 3:
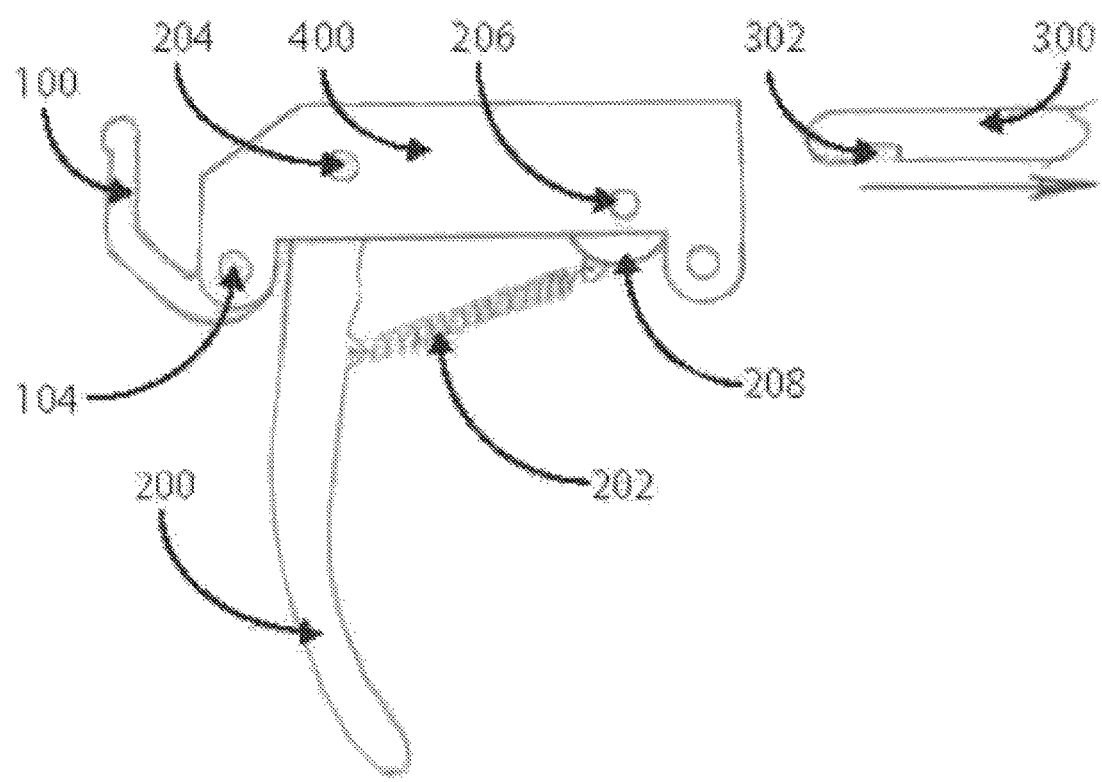
FIG. 3 is a perspective view of the present invention, as it would be seen during firing the speargun, with the safety disengaged.

Referring now to FIG. 3, the speargun is shown as it would be seen during firing the spear shaft 300 from within the receiver 400. The safety lever 100 is disengaged, so that the safety block 102 (not shown) would be within the receiver 400. The trigger 200 has been pulled fully posteriorly, as allowed by the absence of the safety block 102. The spear shaft 300 is shown propelled forward.

To summarize the workings of this safety system as demonstrated in all Figures: when the spear shaft 300 is unloaded, the trigger 200 is pulled fully forward by the return spring 202. The user must disengage the safety lever 100 to load the speargun. Once disengaged, forcefully pressuring the spear shaft 300 into the receiver 400 causes the trigger 200 to engage with the shaft notch 302 upon the spear shaft 300 (via the omitted sear and sear stop tang), thus loading the speargun. It will be readily apparent to the user, having just loaded the gun, that the safety lever 100 is disengaged. Before engaging the propulsion bands (omitted) to allow propulsion of the spear 300, the user will have a visible and mental reminder to engage the safety lever 100. At this point, the user will engage the safety lever 100, causing the safety block 102 to abut the posterior portion of the trigger 200. The trigger 200 will then effectively be prevented from posterior (by the trigger block 202) or anterior (by the mated trigger 200 to the shaft notch 302 via the sear stop tang and sear) travel. Once the propulsion bands (omitted) are attached to the spear shaft 300, all the user must do to fire the speargun is disengage the safety lever 100, allowing posterior travel of the trigger 200 by removing contact with the safety block 102.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the described embodiment, method, and examples, but by all embodiments and methods within the scope and spirit of the invention as claimed.

What is claimed is:

1. A safety mechanism for a speargun, said mechanism comprising:
    a receiver having a posterior end, an anterior end, a top side, a bottom side, a left side, a right side and an interior cavity capable of hosting additional parts of the safety mechanism, including a safety lever, said receiver further having an opening at the anterior end capable of receiving a spear shaft;
    a trigger rotationally mounted between the left side and the right side of the receiver by means of a pivot point at a location just anterior to the safety lever;
    the safety lever rotationally mounted between the left side and the right side of the receiver by means of a pivot point, said safety lever having portions both external to the posterior end of the receiver and internal to the posterior end of the receiver, said external portion of the safety lever, when pushed towards the anterior end of the receiver, prevents travel of the trigger towards the posterior end of the receiver;
    a tensioning device coupled on one end to the trigger and at the other end to an attachment point proximal to the bottom side of the anterior end of the receiver.

2. The safety mechanism as defined in claim 1, wherein the the safety lever, when engaged in a position towards the anterior end of the receiver, prevents travel of the trigger towards the posterior end of the receiver.

3. The safety mechanism as defined in claim 1, wherein the the safety lever, when disengaged in a position towards the posterior end of the receiver, allows travel of the trigger towards the posterior end of the receiver.

4. The safety mechanism as defined in claim 1, wherein the spear shaft is not capable of travel from the anterior end of the receiver unless the safety lever is disengaged and the trigger is pulled towards the posterior end of the receiver by a user.

5. The safety mechanism as defined in claim 1, wherein the tensioning device is a spring.

* * * * *